No. 842,375. PATENTED JAN. 29, 1907.
L. J. ASHWORTH.
DRAIN VALVE.
APPLICATION FILED MAR. 14, 1906.

Witnesses
L. B. Bridges
R. W. Bishop

Inventor
Lewis Jackson Ashworth,
By Davis & Davis,
Attorneys

UNITED STATES PATENT OFFICE.

LEWIS JACKSON ASHWORTH, OF HUNTINGTON, WEST VIRGINIA.

DRAIN-VALVE.

No. 842,375.              Specification of Letters Patent.         Patented Jan. 29, 1907.

Application filed March 14, 1906. Serial No. 306,022.

*To all whom it may concern:*

Be it known that I, LEWIS JACKSON ASHWORTH, a citizen of the United States of America, and a resident of Huntington, county of Cabell, State of West Virginia, have invented certain new and useful Improvements in Drain-Valves, of which the following is a full and clear specification, reference being had to the accompanying drawings, in which—

Figure 1:
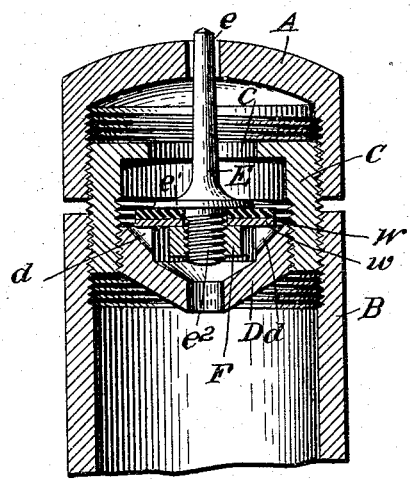
Figure 2:
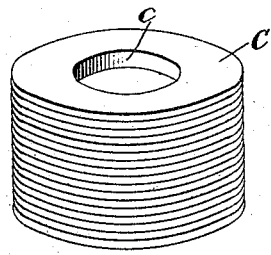
Figure 3:
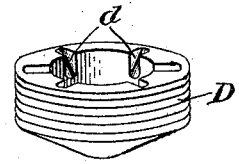

Figure 1 is a vertical sectional view showing the valve open to permit ingress of air; Fig. 2, a detail perspective view of the valve-chamber, and Fig. 3 a detail perspective view of the removable bottom of the valve-chamber.

The object of this device is to automatically permit air to have ingress into the pipe, of the system whenever the water is drawn off therefrom and to automatically close when the water is again turned into the pipe, to thereby prevent egress of water, as more fully hereinafter set forth.

Referring to the drawings annexed by reference-letters, B designates the upper end of one of the water-pipes of the system, and C a cylindrical valve-chamber screwed into the upper end of the pipe B, the upper end of this chamber being closed except at the central opening $c$. The lower end of this chamber is closed by a cup D, screwed up into it, so as to be adjustable therein. This closing device is dished downward and is provided with a central opening which leads up into the center of the depression of the cup. Lateral notches $d$ are formed in the inner upper edges of the cup.

The valve E consists of an upwardly-tapering stem $e$, extending up through the center of the opening $c$. This stem is provided with a circular flange or plate $e'$, from which flange depends a threaded stem $e^2$, on which is screwed a nut F, which nut clamps a metal washer $w$ and an elastic washer W against the under side of the flange $e'$. A cap A is screwed down over the projecting upper end of the valve-casing C and is provided with a central hole up through which stem $e$ projects.

It will be observed that when the pressure of the water in the pipe B is removed the valve will fall until its washer $w$ rests upon the upper edge of the cup, thereby permitting the air to descend through the opening in the cap A, opening $c$, and notches $d$. When the water is again permitted to flow up into pipe B, it jets through the central opening in the plug or cap D and instantly forces the valve to its seat over the opening $c$, the elastic washer insuring a tight joint and preventing the escape of water. The upward-tapering stem $e$ does not prevent the ingress of air, but does serve to guide the valve to its seat. The removable plug D not only permits ready insertion and removal of the valve, but also forms a lower rest for the valve which may be readily adjusted with respect to the valve-seat proper to insure a proper closing of the valve under all conditions.

Having thus fully described my invention, what I claim, and desire to secure by Letters Patent, is—

1. In combination with a water-pipe internally threaded, a valve-chamber screwed therein and provided with an opening in its upper side and threaded internally, a cap removably fastened on the projecting upper end of the valve-chamber and provided with a central hole, a plug or bottom screwed up into the lower end of the valve-chamber and provided with a central opening and air-passages leading to said opening, and a valve inclosed in the valve-chamber and provided with a stem extending upward through the opening in the top of the valve-chamber and into the central opening in the cap.

2. In combination with a water-pipe, a valve-chamber screwed into the upper end thereof and threaded internally and provided with a central opening in its top, a plug or bottom screwed up into the valve-chamber so as to be adjustable therein and provided with a central opening and lateral air-passages leading thereto, a valve within the chamber and adapted to normally rest upon said plug or bottom over the central opening therein and adapted to seat up against the under side of the top of the valve-chamber.

In testimony whereof I hereunto affix my signature, in the presence of two witnesses, this 6th day of March, 1906.

LEWIS JACKSON ASHWORTH.

Witnesses:
VIRGIL J. WARREN,
WILLIAM M. STEVENS.